(12) United States Patent
Rolle (10) Patent No.: US 11,481,513 B2
(45) Date of Patent: Oct. 25, 2022

(54) DECENTRALIZED STORAGE OF PERSONAL DATA

(71) Applicant: SAP SE, Walldorf (DE)

(72) Inventor: Benny Rolle, Karlsruhe (DE)

(73) Assignee: SAP, SE, Walldorf (DE)

( * ) Notice: Subject to any disclaimer, the term of this patent is extended or adjusted under 35 U.S.C. 154(b) by 154 days.

(21) Appl. No.: 16/994,191

(22) Filed: Aug. 14, 2020

(65) Prior Publication Data

US 2022/0050920 A1 Feb. 17, 2022

(51) Int. Cl.
  *G06F 21/62* (2013.01)
  *G06F 7/04* (2006.01)
  *H04N 7/16* (2011.01)

(52) U.S. Cl.
  CPC ...... *G06F 21/6254* (2013.01); *G06F 21/6263* (2013.01)

(58) Field of Classification Search
  CPC .................. G06F 21/6254; G06F 21/6263
  See application file for complete search history.

(56) References Cited

U.S. PATENT DOCUMENTS

| | | | |
|---|---|---|---|
| 7,930,197 B2 | 4/2011 | Ozzie et al. | |
| 8,365,291 B1 * | 1/2013 | Le | G06F 21/6263 726/25 |
| 8,595,058 B2 | 11/2013 | Fordyce, III et al. | |
| 9,722,973 B1 * | 8/2017 | Kothari | G06F 21/6263 |
| 10,936,752 B2 * | 3/2021 | Gkoulalas-Divanis | G06F 21/577 |
| 11,106,823 B1 * | 8/2021 | Brook | G06F 40/174 |
| 2008/0082393 A1 * | 4/2008 | Ozzie | G06Q 10/063 705/7.11 |

(Continued)

FOREIGN PATENT DOCUMENTS

| | | | |
|---|---|---|---|
| WO | WO-2018201009 A1 * | 11/2018 | G06F 21/00 |
| WO | WO 2019/028405 | 2/2019 | |

(Continued)

OTHER PUBLICATIONS

Akamai, "Overview of Akamai's Personal Data Processing Activities and Role," https://www.akamai.com/us/en/multimedia/documents/akamai/overview-of-akamai-personal-data-processing-activities-and-role.pdf, 10 pages, Apr. 2018.

(Continued)

*Primary Examiner* — Darshan I Dhruv
(74) *Attorney, Agent, or Firm* — Klarquist Sparkman, LLP (57) ABSTRACT

Systems and processes for managing personal data are provided herein. Personal data associated with a data subject may be received or derived in association with a virtual identity of the data subject. The personal data may be stored, and identifying information that is linked to the personal data may be stored, where the identifying information is included in shadow data associated with the personal data. The identifying information may include a virtual identity identifier of the virtual identity, and, in some examples, a creation timestamp of the personal data. When a request to retrieve personal data for a data subject, shadow data storage may be searched to locate identifying information provided in the request, and personal data items linked to the located identifying information may be returned as a result of the request.

19 Claims, 8 Drawing Sheets

(56) References Cited

U.S. PATENT DOCUMENTS

| | | | |
|---|---|---|---|
| 2011/0093327 A1* | 4/2011 | Fordyce, III | G06Q 30/0224 |
| | | | 705/14.66 |
| 2016/0050205 A1* | 2/2016 | Heller | H04L 63/10 |
| | | | 726/4 |
| 2017/0207916 A1* | 7/2017 | Luce | G06F 21/6254 |
| 2019/0018985 A1 | 1/2019 | Rolle et al. | |
| 2019/0156053 A1 | 5/2019 | Vogel et al. | |
| 2019/0294822 A1* | 9/2019 | Hennebert | G06F 21/602 |
| 2020/0019728 A1 | 1/2020 | Rolle | |
| 2020/0195690 A1* | 6/2020 | Barday | H04L 63/04 |
| 2020/0296140 A1* | 9/2020 | Buchner | G06F 21/604 |
| 2020/0351310 A1* | 11/2020 | Leighton | H04L 9/3234 |
| 2021/0007012 A1* | 1/2021 | Song | H04W 28/26 |
| 2021/0264054 A1* | 8/2021 | Anson | G06F 21/725 |
| 2021/0266297 A1* | 8/2021 | Troitsky | H04L 63/0421 |

FOREIGN PATENT DOCUMENTS

| | | | | |
|---|---|---|---|---|
| WO | WO-2019070675 A1 * | 4/2019 | | G06F 21/52 |
| WO | WO-2019246568 A1 * | 12/2019 | | G06F 21/6245 |
| WO | WO-2021260418 A1 * | 12/2021 | | |

OTHER PUBLICATIONS

Information Commissioner's Office (ico.), "What are Identifiers and Related Factors?," https://ico.org.uk/for-organisations/guide-to-data-protection/guide-to-the-general-data-protection-regulation-gdpr/what-is-personal-data/what-are-identifiers-and-related-factors/, 1 page, (at least as early as May 25, 2020).

* cited by examiner

DECENTRALIZED STORAGE OF PERSONAL DATA

BACKGROUND

Organizations that collect personal data from individuals are typically subject to regulations or rules regarding protection and accessibility to the data. For example, the General Data Protection Regulation (GDPR) includes provisions and requirements for data controllers (e.g., the natural or legal person, public authority, agency or other body which, alone or jointly with others, determines the purposes and means of the processing of personal data, as defined in Article 4 of the GDPR). The provisions and requirements of the GDPR include protecting the rights of data subjects that correspond to collected personal data (e.g., by following principals in Article 5 of the GDPR, which may include pseudonymization of the data or other practices) and providing personal data of a particular individual to that individual if requested (e.g., in accordance with the provisions in Article 15 of the GDPR, which includes the provision that the right to obtain a copy of personal data shall not adversely affect the rights and freedoms of others). As the data stored for a particular individual by a data controller may include different types of personal data that is distributed within one or multiple databases, it may be difficult to efficiently identify and provide an individual's personal data to the individual while maintaining security and privacy of other data collected by the data controller. Accordingly, there remains a need for improved technologies to manage personal data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for managing, processing, and distributing personal data for a data subject that is concerned with the personal data. In some examples, the disclosed technologies can be implemented as a method performed by a computer. For example, the method may include receiving personal data associated with a data subject, wherein the personal data is associated with a virtual identity of the data subject, storing the personal data, and storing identifying information (e.g., information that potentially identifies the data subject) that is linked to the personal data. The identifying information may be included in shadow data associated with the personal data, and the identifying information may include a virtual identity identifier of the virtual identity and a creation timestamp (e.g., a timestamp of the original personal data collection and/or a timestamp of a derivation of a personal data item from the original personal data) of the personal data. The personal data may, in some instances, be stored without being associated with a civil identity of the data subject.

In some examples, the disclosed technologies can be implemented as computer-readable media storing instructions which, when executed by one or more hardware processors, cause the hardware processors to perform the following actions: detecting a request for retrieval of personal data for a data subject, identifying parameters of the request, the parameters including at least one virtual identity identifier for the data subject and a time parameter associated with the virtual identity identifier, searching data storage to locate shadow data that includes identifying information matching the parameters of the request, the located shadow data being linked to associated personal data, and outputting the associated personal data to the data subject. The associated personal data may be stored without being associated with a civil identity of the data subject.

In some examples, the disclosed technologies can be implemented in a system including one or more hardware processors with coupled memory, and computer-readable media storing instructions executable by the one or more hardware processors. The instructions include first, second, third, and fourth instructions. The first instructions, when executed, cause the system to receive a request for personal data associated with a plurality of virtual identities of a data subject, the plurality of virtual identities of the data subject including a first virtual identity. The second instructions, when executed, cause the system to locate instances of first identifying information corresponding to the first virtual identity in data storage memory locations that store shadow data for a plurality of personal data items. The third instructions, when executed, cause the system to identify, for each instance of the identifying information, a respective personal data item that is linked to the data storage memory location in which the instance of the identifying information is stored. The fourth instructions, when executed, cause the system to output the respective personal data items.

The foregoing and other objects, features, and advantages of the invention will become more apparent from the following detailed description, which proceeds with reference to the accompanying figures.

DETAILED DESCRIPTION

Introduction and Overview

Data controllers and/or collectors are typically subject to rules and/or regulations regarding the processing and maintenance of personal data. For example, as described above, some regulations include a requirement that a data controller must give personal data that concerns one data subject to that data subject if requested, as long as such a provision of data does not affect the rights of others. While this request may occur relatively infrequently compared to the amount of data that is processed, the data controller is still responsible for providing mechanisms to service such requests.

One solution to accommodate requests for personal data is to have, for each data subject, a data subject entity within a database that includes general data about the data subject and additionally pointers (e.g., implemented as foreign-key-relationships in relational databases) to further personal data about the data subject. As used herein, a data subject entity may be understood to include any entity that represents a data subject, which could include a customer, supplier, employee, workforce person, business partner, etc. that represent a data subject. A data subject is a person whose personal data is being collected, held, or processed (e.g., where processing may include any activities that can be done with personal data, including collection, storing, computer processing, destructing, etc., as provisioned in Article 4(2) of the GDPR). However, this solution may have some technical problems and/or disadvantages. For example, it is not in every case clear whether some portions of the data are personal data and, if it is personal data, whether this data is actually related to the targeted data subject. For example, one human might have several virtual identities. A virtual identity is an identity that is not defined by an individual's civil data (e.g., name, birthdate, etc.) but by other virtual identity identifiers (e.g., IP addresses, email addresses, cookie identifiers, etc.) that can be uniquely associated with the data subject (e.g., when viewed in combination with other linked data, such as a timestamp Thus, a processor might process some personal data of a data subject that is related to the data subject's civil identity and some other personal data that is related to the data subject's IP address (or other virtual identity identifier).). It is to be understood that a virtual identity or virtual identity identifier may also include parts of a civil identity (e.g., parts of a name). However, in some examples, in which a relational database includes a linkage between civil data and non-civil virtual identities or virtual identity identifiers, only the virtual identity or virtual identity identifier may be stored in the shadow data. The virtual identity is able to be used to identify or at least singularize the data subject, at least at the end of a storage period. In some examples, the order-ID (e.g., in the case of an online merchant), a request-ID, and/or another environment-specific ID may be virtual identifiers, as a data subject may be able to prove association with the identifier (e.g., a customer of the online merchant may be able to prove, such as with an invoice statement, that he/she is the customer with a particular order-ID). With the above-described approach of having a data subject entity with pointers to personal data, during the runtime of normal business processes, heavy data subject identifying processes would run (synchronously) for a rare case.

Furthermore, the data subject's right of getting a copy of his/her personal data (e.g., right of access to personal data concerning himself or herself) does not only include master data but also transactional data. For example, a transaction may be created for a master data object, and the transaction may include a reference to the master data record (e.g., an order may include a reference to the customer record for which the order is intended). The transactional documents for a master data record may thus be located via foreign-key relationship. Thus, the process of identifying the data subject would run during every transaction if personal data is inserted into the database so that this pointer can be written. Further still, some regulations may not allow the preparation of a pointer between a data subject entity and all personal data within that system, as some regulations may stipulate that different personal data is to be stored separately.

As another potential disadvantage of the above-described solution, the pointer between the data subject entity and a personal data piece may be incorrect (e.g., invalid, misdirected, etc.). For example, if a data subject logs in from an IP address with a cookie stored within his/her browser before another data subject uses the same computer system with the same cookie and the same IP address, it may be difficult to separate which personal data belongs to which data subject. Thus, the pointers between data subject entities and personal data may be inaccurate.

As described herein, the present disclosure addresses the above technical problems and/or provides advantages. The technical improvements described herein may be used by various applications that run on a computing system. Thus, the technical improvements may be built-in into a platform and the associated functionality may be used by applications that run within an associated environment.

The following description provides some example approaches, which may include changes to the above-described data subject entity/pointer approach, to overcome the technical problems and/or disadvantages described above. In one example, instead of storing the linkage between the data subject and the personal data of that data subject in the form of "data subject entity→pointer to personal data," (or by foreign-key relationships in relational databases) every piece of personal data may include an identifier of an associated virtual identity and a creation timestamp of that respective piece of personal data. In this way, a direct linkage between the data subject entity and relating pieces of personal data may be reduced or eliminated in some examples.

The personal data identifier and the creation timestamp may be stored in so-called "shadow data." A technique that may be used for this storage is dynamic taint tracking. The disclosed systems and methods may be built on top of a taint-aware version of a runtime environment (e.g., Node.js®) that has been modified to include data subject tracking and other features. For example, the memory space of a variable may include a pointer to another memory address that includes additional data (in this case: the data subject's personal data identifier and the creation time stamp). Furthermore, this data may be inherited to derived data of the original personal data. In this way, the personal data may be linked to the virtual identity identifier. With this step, the deriving of the data subject's civil identity may not be performed, as other identifying data may be used (e.g., IP addresses, login data such as email address, cookie identifiers, etc.) that are valid for a certain timestamp.

The data processing process for the improved approaches described herein may utilize fewer computing resources than at the time of business processes. Rare processes that utilize a large amount of resources may only be performed when necessary, which saves computing time and costs. If an associated application is hosted at external providers, the saved costs may be external costs. Furthermore, the described processes for providing a copy of personal data may be performed asynchronously to regular business processes (e.g., such that the request for personal data does not affect the regular processing of data by the data controller and/or occurs when computing time is otherwise less costly, for example, if the request is made at the end of a fiscal year when other year-end long-running processes are being performed, the processing of the request may be postponed for some days).

The above-described improvements may help to ensure that a data controller maintains compliance with regulations. For example, if a data subject requests a copy of his/her personal data (e.g., personal data concerning him/her), then the data subject may describe by which virtual identities he or she is represented. In some examples, the data controller may provide suggestions as to which data the data subject can provide to describe by which virtual identities he or she is represented. For example, the data subject may only be interested in personal data that does belong to his/her login data, but not to server log files (e.g., that belong to the IP address in a selected time range). The data subject may provide proof that he/she is the legitimate person to request this personal data. The proof may include the time range in which the personal data identifier belongs to the data subject (e.g., in the case of IP addresses). For each type of virtual data identifier, different types of proof may be useable (e.g., a statement by an access provider about an IP address). The data controller may describe the process for proving an identity and/or requesting personal data in a privacy statement.

As described above, the disclosed systems and methods may be built in into a platform. For example, the disclosed systems and methods may be built in into a platform kernel of a platform-as-a-service (PaaS) environment. In this way, the functionality of the disclosed systems and methods may be offered to applications built on the platform. In order to utilize the functionality, applications on the platform may introduce the virtual identity identifier and the creation timestamp as soon as personal data is captured, collected, and/or generated (e.g., if the personal data is derived from an originally collected personal data item), and the disclosed systems and methods may utilize the data to perform the personal data management described herein (e.g., to fulfill access requests to personal data).

In some examples, the disclosed systems and methods may be used for managing a portion of personal data available within one application. For example, the disclosed systems and methods may be used only for personal data that are not linked to the civil identity of the data subject. As an additional or alternative example, the disclosed systems and methods may only be used for computing expensive types of personal data (e.g., personal data that cannot be easily linked to the civil identity of the data subject). In some of the above examples, requests for personal data may utilize a combination of approaches, such as using the disclosed systems and methods (e.g., utilizing virtual identities and timestamps) to retrieve personal data that is not linked (or not easily linked) to the civil identity of the data subject and using the civil identity of the data subject to retrieve personal data that is linked (or is easily linked) to that civil identity.

First Example Method of Storing Personal Data

Figure 1:
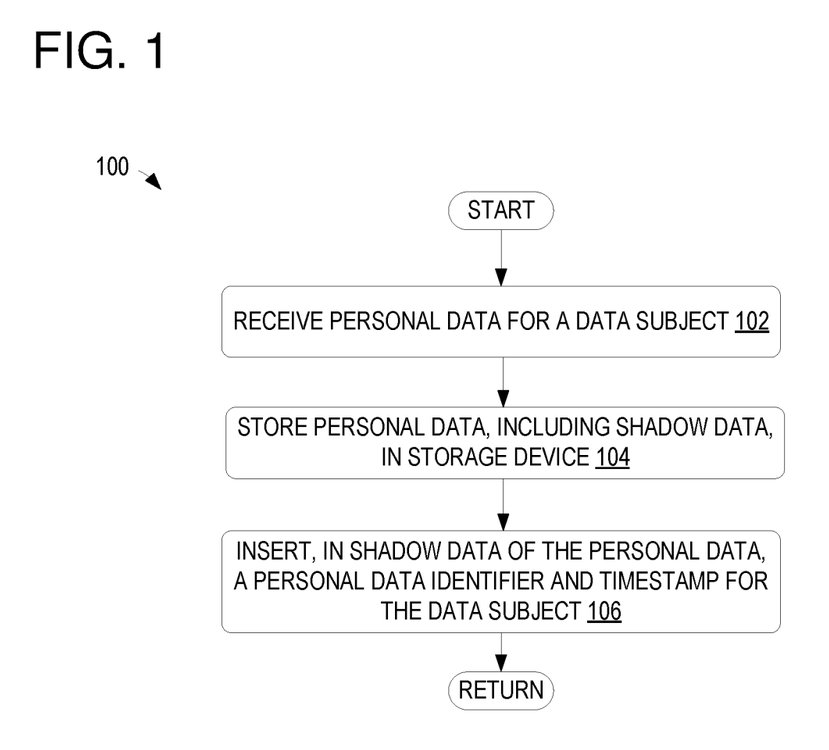
FIG. 1 is a flowchart of an example method for storing personal data in association with virtual identities of a data subject.

FIG. 1 is a flowchart 100 of an example method for managing, at a data controller, personal data for a data subject. At 102, the method includes receiving personal data for the data subject. The received personal data may include any information that is related to an identified or identifiable individual that may be transmitted to and/or collected by the data controller, such as telephone, credit card, or personnel number of a person, account data, number plate, appearance, customer number, address, etc., and/or transactional documents, such as orders, customer support tickets, etc. The personal data may be transmitted to and/or collected by the data controller during interaction with an asset of the data controller (e.g., a website, application, etc.) by the data subject associated with the personal data. For example, the data controller may store data concerning a particular data subject and, based on the stored data, derive further personal data (e.g., in an online merchant scenario, the controller may analyze items that a customer owns to determine other items in which the customer may be interested, and the customer's presumed interest in these other items may be stored as personal data that also includes the customer's virtual identifier in the shadow data. Based on taint-tracking, this derivation may happen automatically in some cases, in which the personal data is directly derived. The data received at 102 is understood to include the original collected personal data and/or derived personal data as described above.

At 104, the method includes storing the personal data in a storage device, such as a main memory (RAM) of the computing system(s) used by the data controller to manage the personal data and/or main memory of a runtime environment, such as Node.js®. The personal data may include shadow data, which is data within a data object that is not visible to/accessible by most applications or application programming interfaces (APIs) (e.g., applications or APIs that are generally used by the software and/or technology that the data controller uses to process the personal data for the purposes that it was collected). However, the shadow data may be accessible to other APIs (e.g., a modified taint-tracking API as described herein) that is used to identify personal data for a data subject (described in more detail below with respect to FIG. 2). In some implementations, the shadow data is not accessible to any applications or APIs other than a taint-tracking API that is configured to access the shadow data.

At 106, the method includes inserting, in the shadow data of the personal data, identifying information including a personal data (e.g., a virtual identity) identifier associated with the data subject and a creation timestamp for the personal data. The creation timestamp may include a timestamp corresponding to a time of collection of a personal data item (e.g., an IP address) and/or, for personal data items that are derived from an originally collected personal data item, a timestamp corresponding to a time of derivation of the personal data item. One or both of the above-described timestamps may be stored in the shadow data. As described with respect to FIG. 5 below, data received from the data subject may be stored in coordination with shadow memory to allow for taint tracking. For example, a given memory location used for storing personal data may have a corresponding shadow memory that stores a pointer to a taint data structure if that location is tainted. Accordingly, at 106, the shadow memory may be populated with the personal data identifier and timestamp for the data subject associated with the corresponding memory location at which the personal data received at 102 is stored.

The storage of personal data as described in FIG. 1 may enable the data controller to identify and access personal data of a data subject by targeting parameters provided by the data subject in a personal data request (e.g., a request for access to personal data). An example of servicing a personal data request is described below with respect to FIG. 2.

Example of Servicing a Personal Data Request

Figure 2:
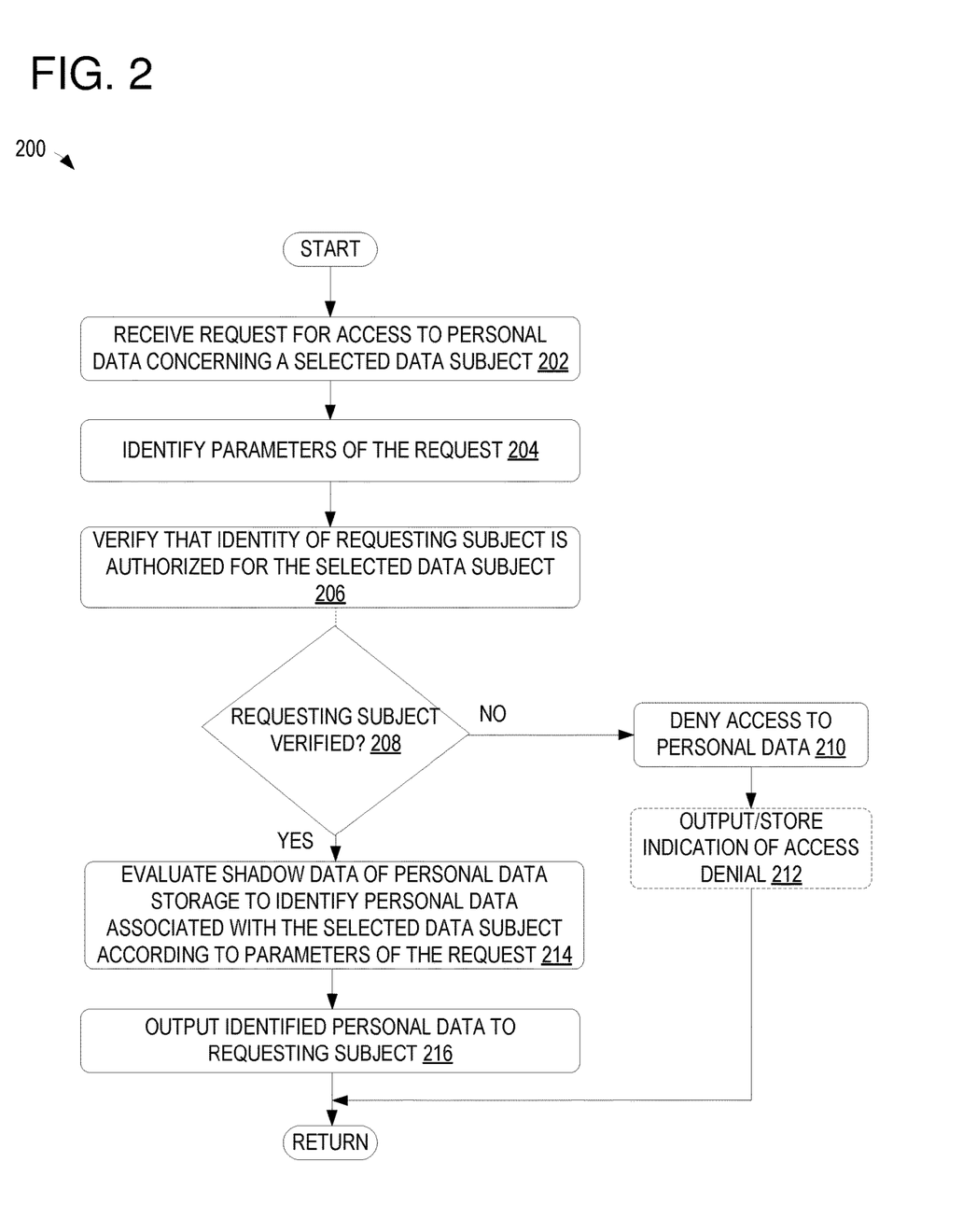
FIG. 2 is a flowchart of an example method for retrieving requested personal data for a data subject.

FIG. 2 shows an example method 200 for servicing a request for personal data. At 202, the method includes receiving (e.g., at a data controller or associated device), a request for access to personal data concerning a selected data subject. At 204, the method includes identifying parameters of the request. For example, a data subject may be associated with different data subject identifiers at different times and/or when using different devices. Accordingly, the parameters identified at 204 may include a targeted time range(s) for personal data associated with one or more types of data subject identifiers (e.g., device-based identifiers, such as MAC addresses, IP addresses, etc., user-based identifiers, such as user names, email addresses, physical addresses, biometric information, etc., and/or other identifiers). The parameters may be identified by parsing the request and/or otherwise parsing data received by the requesting subject or a proxy (e.g., for a scenario in which a service agent asks the requesting subject for parameters, the service agent may directly input the parameters into a computing system associated with the data controller). The parameters may be input by the requesting subject or proxy via a user interface and/or otherwise identified via an API call or other processing routine.

At 206, the method includes verifying that an identity of the requesting subject is authorized for the selected data subject. This verification may include verifying that the data subject is who he/she claims to be (or, if a third-party subject requests the data, that this third-party subject is authorized by the data subject and that it is verified that the data subject authorizing the third-party subject is who the third-party subject claims him/her to be) and that the identifying parameters are correct for a time range in which the timestamps from the shadow data of the personal data belong. For example, the verification may include an association of a time range in which a targeted personal identifier belonged to the selected data subject, a statement by an access provider about an IP address, etc. At 208, the method includes determining if the requested subject has been verified (e.g., where the requesting subject may be a data subject or a third-party subject and where the requesting subject is verified by one or more of the example verifications described above at 206). If the requesting subject is not verified (e.g., "NO" at 208), the method proceeds to 210 and includes denying access to the personal data. As indicated at 212, the method optionally further includes outputting and/or storing an indication of the access denial.

If the requesting subject is verified (e.g., "YES" at 208), the method includes evaluating the shadow data of the personal data storage to identify personal data associated with the selected data subject according to parameters of the request, as indicated at 214. For example, the data controller may search the shadow data in personal data memory storage devices to identify personal data matching the request parameters. At 216, the method includes outputting the identified personal data to the requesting subject.

Examples of Personal Data Storage

Figure 3:
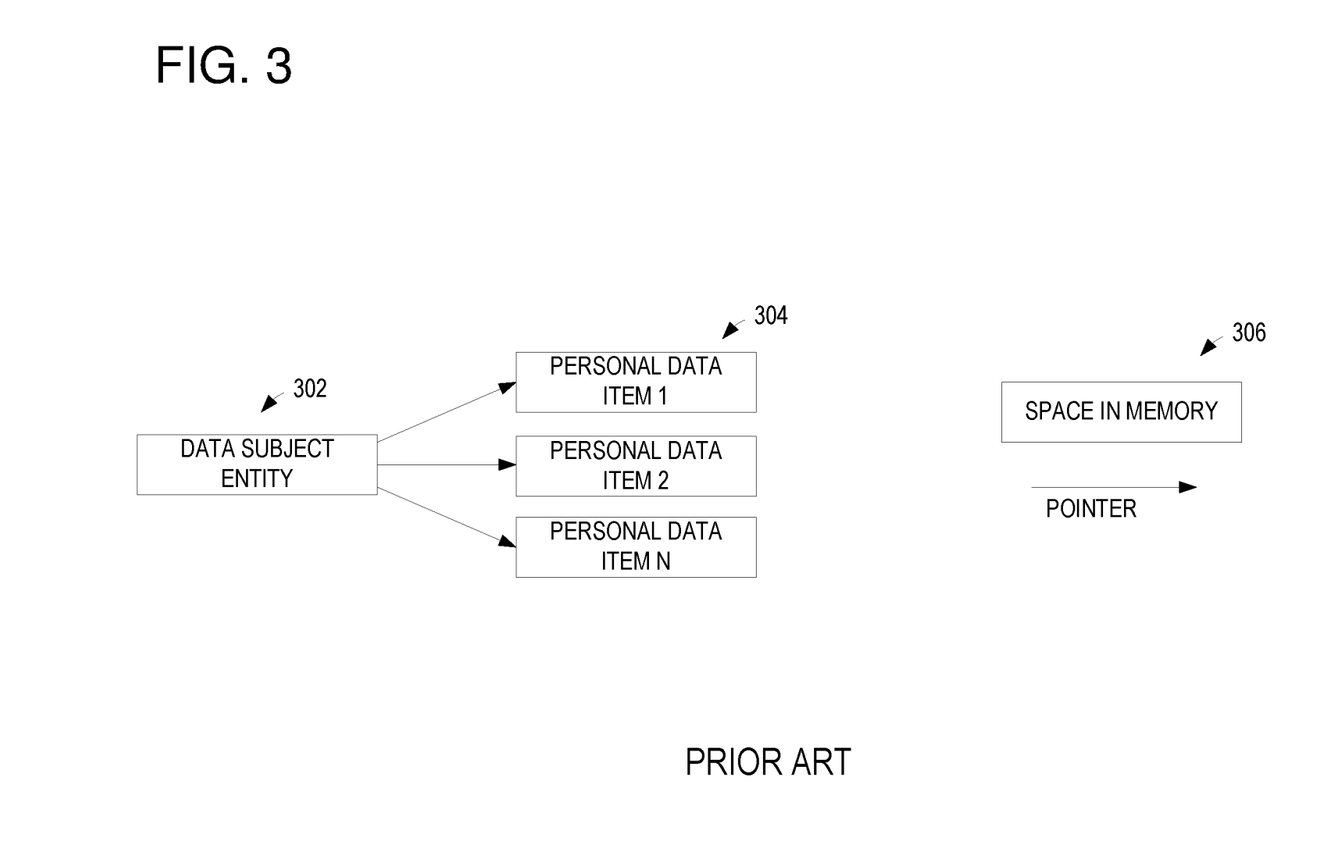
FIG. 3 is a diagram schematically depicting the storage and linkage of personal data items to a data subject entity in accordance with a prior, centralized approach.

FIG. 3 shows a prior, centralized approach to storing personal data in memory. As shown, a single data subject entity 302 is stored in a database. The data subject entity 302 may include general data about a data subject as well as pointers (e.g., implemented as foreign-key relationships in relational databases) to further personal data items 304 (e.g., personal data items 1-N) about the data subject. Accordingly, a memory space 306 that is searched for retrieving personal data may include the data subject entity and a pointer to personal data items linked to that data subject entity. In this way, a personal data request may include an identification of the data subject entity in order to locate the linked personal data items.

However, the centralized approach has some disadvantages, which are described in more detail above. For example, the data subject entity may not be representative of all virtual identities of a data subject, or may be incorrectly linked to a virtual identity that does not belong to the data subject.

Figure 4:
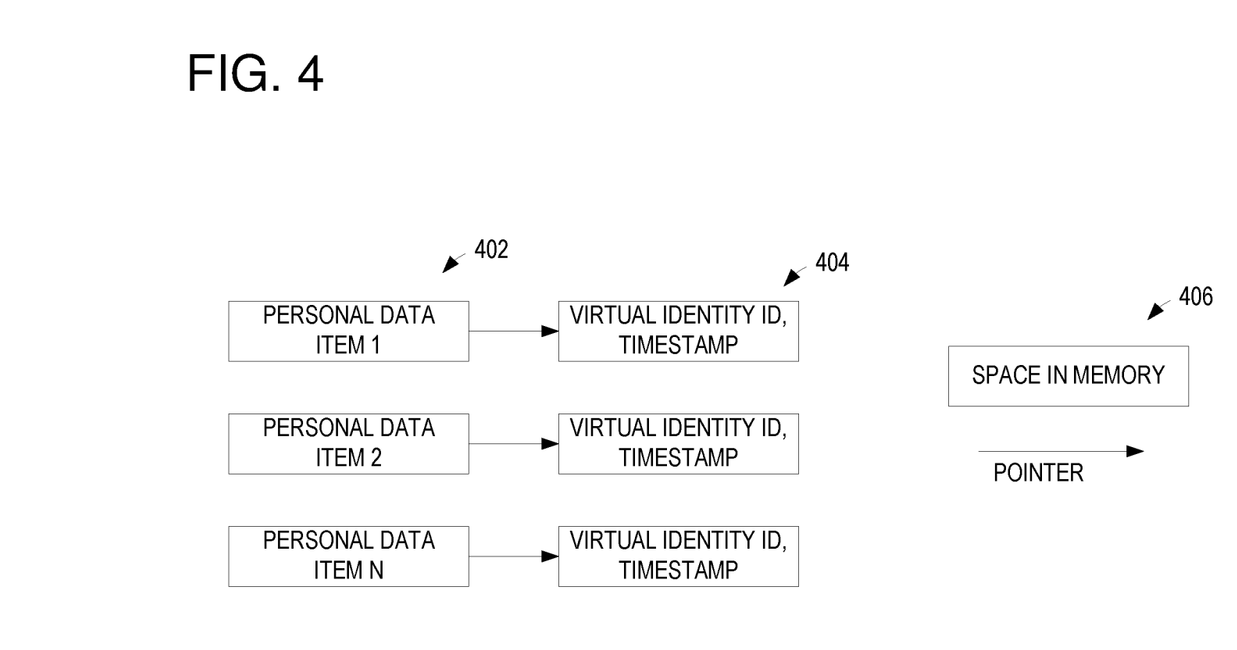
FIG. 4 is a diagram schematically depicting an example decentralized approach to storing and linking personal data items to virtual identities.

In order to address the above-described disadvantages, FIG. 4 schematically shows an example decentralized approach to storing personal data in memory. As shown, a plurality of personal data items 1-N, shown at 402, are each augmented to include, as shown at 404, a respective virtual identity ID and timestamp corresponding to the personal data item. For example, if all of the personal data items 1-N relate to the same data subject, then each personal data item may be augmented to include the same virtual identity ID along with timestamp information that is particular to the respective personal data item (e.g., for each personal data item, the timestamp corresponds to a time at which that personal data item was generated, transmitted, and/or received/collected). In other examples, the personal data items may include different virtual identity IDs.

As described above, the virtual identity ID and timestamp are stored in shadow data of the respective personal data items. Accordingly, the memory space 406 of a variable associated with a personal data item includes a pointer to another memory address that includes the virtual identity identifier and timestamp for that personal data item. In this way, the virtual identity identifier and timestamp may be inherited to derived data of the associated original personal data item.

Example of Using Taint Tracking for Personal Data Tracking

Figure 5:
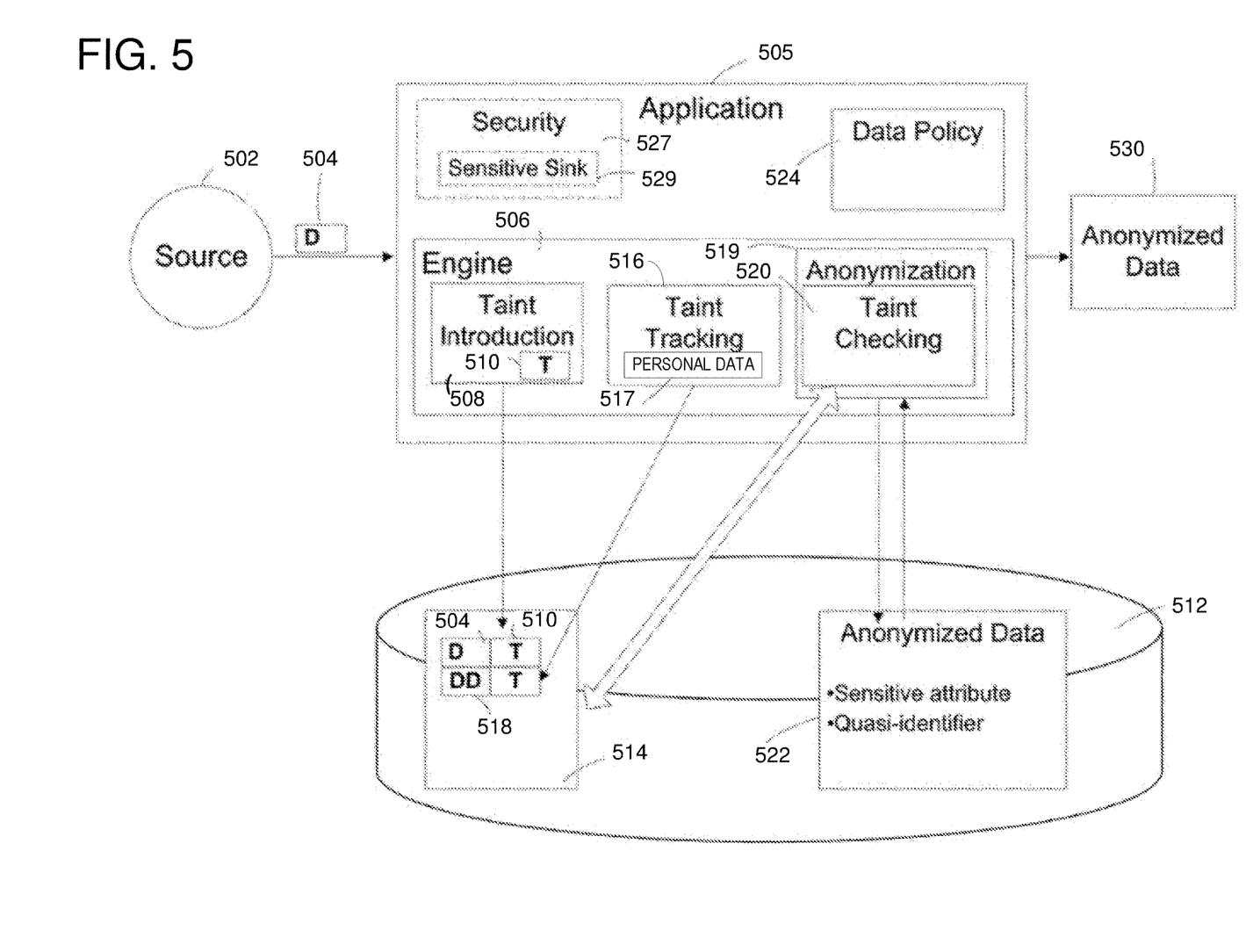
FIG. 5 shows a simplified diagram of a system for managing stored data using taint tracking.

FIG. 5 shows a simplified view of a system according to an embodiment that is configured to implement dynamic data anonymization or pseudonymization utilizing taint tracking. Specifically, system 500 comprises a source 502 that provides data (D) 504 to application 505.

As used herein, the term source refers to the location for entering, storing, and/or collecting data. Examples of sources can include but are not limited to, a user interface, a database, an interface between different systems, a specific procedure, and other types of interfaces.

Personal information regarding specific individuals is one possible form of data that is the subject of anonymization according to embodiments. Examples of such personal data can include (first and last) names, gender, ages, addresses, and/or identifying numbers (e.g., social security numbers). However, embodiments as described herein are not limited to anonymization of personal data. In one example, data regarding particular nations could be stored: e.g., Country-Name, Geographic location (GPS), population, average salary.

For purposes of performing anonymization according to k-anonymity, the Country-Name, GPS, and population may be considered as quasi-identifiers, with the average salary being the sensitive attribute. The resulting anonymization of such a data table would not reveal which country has which average salary.

However, the anonymized data would permit useful findings, for example: "countries in the South have a higher average salary when the population is smaller, countries in the North have a higher salary when the population is bigger". (These example findings are fictitious and provided for illustration purpose only.) Thus in this example, the personal data of a particular individual would not be the subject of anonymization efforts.

The application includes an engine 506 that receives the incoming data, and performs taint introduction 508. The process of taint introduction refers to marking data as tainted, and associating additional information as taint metadata (T) 510 with that data. According to one particular example, the application may potentially be implemented as the Node.js® runtime available from the Node.js Foundation, which may be modified to be taint-aware.

As described below, this introduced taint information serves as semantic content that is considered in order to enhance robustness of a process for anonymizing the data. It is noted that taint information may also be introduced for other purposes such as the detection of injection-type security vulnerabilities—e.g., Cross-Site Scripting (XSS) or SQL Injection.

This data together with the associated taint metadata, may optionally be persisted by the engine in the database 512, for example as a non-anonymized table 514. In some embodiments, the database is a SQL database such as the HANA in-memory database available from SAP SE of Walldorf, Germany. Other database types can include big data platforms that are used for storing extremely large volumes, such as the MongoDB framework. Some embodiments may feature the engine in communication with multiple data stores, to allow selectively storing data according to factors such as cost, volume, and speed.

While FIG. 5 shows storage as a table in a database, this is not required. Tables may be employed because the data to be anonymized typically has the form of a table, but storage in a table is not required in all embodiments.

FIG. 5 further shows the engine performing the process of taint tracking 516 upon the stored data and associated (taint) metadata. Taint-tracking allows the dynamic monitoring of data-flows during program execution, supporting procedures such as anonymization and security vulnerability evaluation. As described above, the taint-tracking 516 may be augmented to include personal data tracking 517. For example, in addition to taint metadata, shadow storage associated with stored data (e.g., personal data items) may include data subject identifying information, such as a virtual identity identifier and a timestamp associated with the corresponding personal data item. The storage, management, and/or processing of data subject identifying information may include one or more of the features described herein with reference to taint-tracking.

Moreover, taint-tracking preserves the tainted status of data thorough its lifetime. Accordingly, embodiments leverage taint-tracking in order to maintain the binding between the data to be anonymized, and the data-policy dictating that anonymization. This taint-tracking includes operations that alter and/or duplicate the data value (e.g., incrementing an integer, or concatenating strings). The taint-data is also propagated to derivative data (DD).

Specifically, new variable values may be generated from operations on tainted data. Those new variable values are termed derivative data 518. The continued presence of the taint information that is ensured by the taint tracking process, allows the derivative data to be anonymized robustly and accurately as well.

FIG. 5 further shows the engine as performing an anonymization procedure 519 together with a taint-checking process 520 in order to create and then store data as an anonymous data table 522 within the database. Taint-checking refers to determining whether a data object or a variable is tainted, and identifying the relevant taint information.

The taint information may be checked and then utilized as part of a process for rendering data into anonymous form according to a data policy 524. Such a data policy may quantify data anonymity according to specific metrics such as k-anonymity, l-diversity, and/or t-closeness.

The k-anonymity and l-diversity metrics characterize data anonymity in terms of sensitive attributes and corresponding quasi-identifiers. The additional consideration of taint information during the anonymization process, offers certain benefits such as robustness against programming errors inadvertently leaking privacy information.

As previously noted, the taint information may also potentially be useful in detecting injection security vulnerabilities. Accordingly, the application further includes an optional security module 527 that is configured to detect security vulnerabilities by referencing the taint information that has been introduced, such that only data from a trusted source flows to sensitive sink 529.

While the particular embodiment of FIG. 5 shows the security module as being external to the engine, this is not required. According to alternative embodiments, the security vulnerability evaluation could be performed by the engine itself.

Finally, FIG. 5 shows the output 530 of data rendered into anonymized form by the application. That anonymous data is in compliance with the dictates of the data policy, which in turn may be based upon the privacy regulations of particular jurisdictions.

While the particular embodiment of FIG. 5 shows the engine as being present in the application separate from the database, this is not required. According to some embodiments, the engine could be implemented in the form of an in-memory database engine present within the in-memory database. Such an embodiment would leverage the large processing power available to an in-memory database, for example the HANA in-memory database available from SAP SE of Walldorf, Germany. Further, while the particular embodiment of FIG. 5 shows the data policy as being present in the application separate from the database, this is not required. According to certain embodiments the data policy could also be stored within the database (e.g., an in-memory database).

Figure 6:
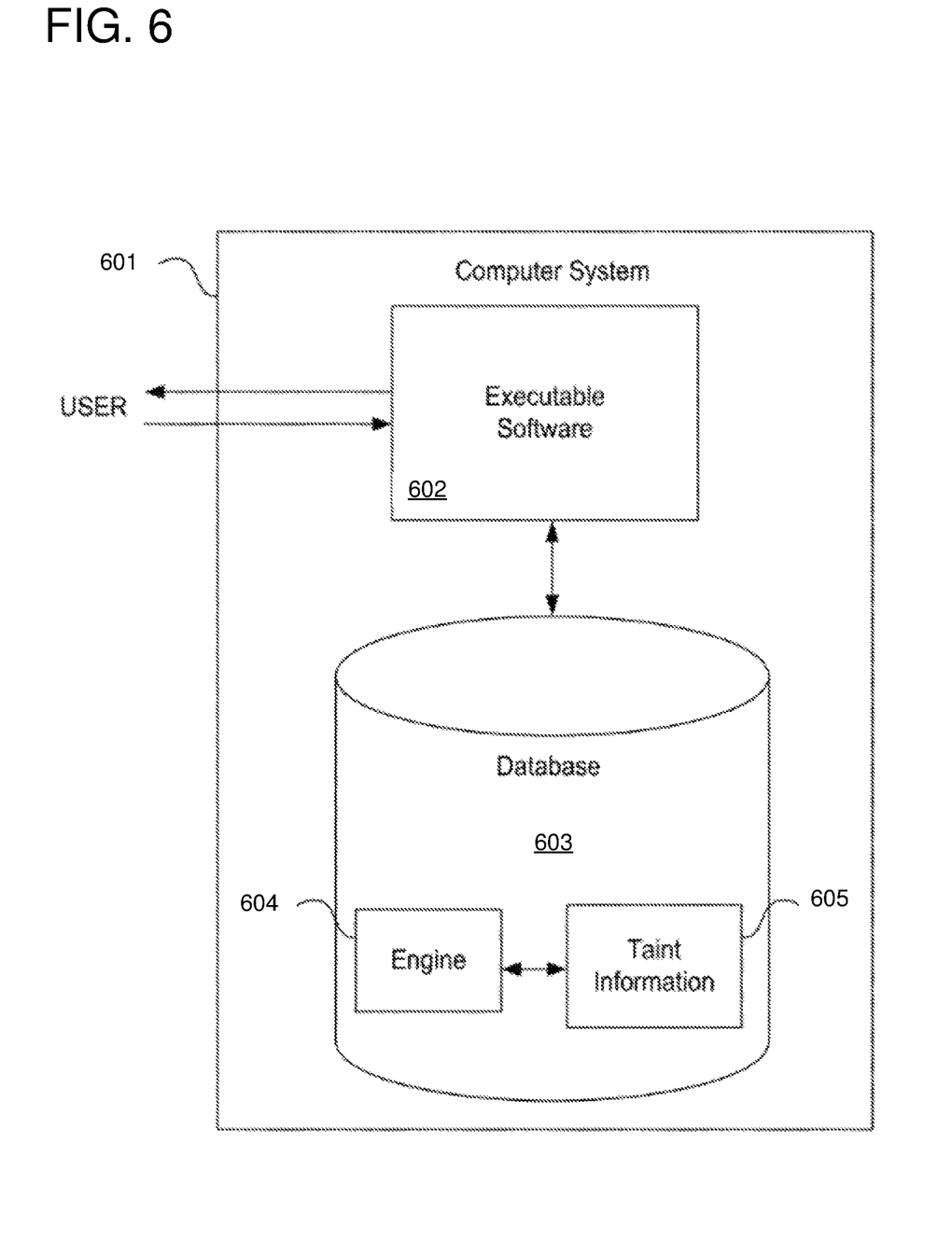
FIG. 6 illustrates an example computer system for managing stored data using taint tracking.

Certain embodiments may be implemented in connection with an in-memory database, with the in-memory database engine responsible for performing one or more actions implementing data anonymization. FIG. 6 illustrates hardware of a special purpose computing machine configured to implement dynamic data anonymization using taint tracking according to an embodiment. In particular, computer system 601 comprises a processor 602 that is in electronic communication with a non-transitory computer-readable storage medium comprising a database 603. This computer-readable storage medium has stored thereon code 605 corresponding to taint information. Code 604 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Example Applications

The following source code shows an example of scanning an entire memory resource (e.g., an entire memory of a fork of the Node.js® runtime environment, such as Node RASP) during runtime to list all personal data relating to a person. In the below example, the whole memory is put into a worklist (e.g., without some black listed parts that are known or understood to not have personal data or that would lead to circular processing), and then, for each object in the memory, the object is checked to determine if shadow data is present. The following source code is written in Java Script and is configured to search through the memory of Node.js® (e.g., not through persistent storage). The example described below performs scans without considering timestamps for the personal data and works with personal data that has the data type "string."

```
'use strict';
/**
 * Scans (nearly) the whole global object for data of a person
 *
 * person_id: the id of the person to find (string), also referred to herein as virtual identifier
 */
function pD_findPerson (person_id) {
const usage = "\n\nUsage: pD.findPerson(person_id)\nperson_id: the id of the person to find
(string)\n";
// Check parameter types
if(typeof person_id !== 'string') {
   throw Error("'person id' is not a string (type: " + typeof person_id + ")"+usage);
}
// Scan (nearly) the whole global-object for the person
var object = global;
// Exclude some subobjects from the scan (performance, circular)
var blacklist = [];
blacklist.push(global.process);
blacklist.push(global.Buffer);
var workspace = []; // List with all objects to scan
var result = {};
function addToResult(subjects, context, value) {
      if(!result[subjects]) {
      result[subjects] = {};
      }
      if(!result[subjects][context]) {
         result[subjects][context] = {};
      }
      if(!result[subjects][context].values) {
         result[subjects][context].values = [];
      }
      if(result[subjects][context].values.indexOf(value) == -1) {
         result[subjects][context].values.push(value);
      }
      return;
}
// Prepare the workspace of objects that will be scanned for the person_id
if(typeof(object) == "string" || object instanceof String) { // might not happen in most cases
   workspace = [{string:object}]; // If the object (e.g., the global-object) is a string, put the string
directly to the worklist.
} else {
   // Copy all properties from the object to be scanned to workspace (without circulars)
   var seenObjects = [object];
   for (var property in object) {
      if(object[property] != object) {
         var copy = {};
         copy[property]=object[property];
         if(seenObjects.indexOf(copy) == -1) {
            workspace.push(copy);
            seenObjects.push(copy);
         }
      }
   }
}
// Loop through the workspace as long as it contains objects
while(workspace.length > 0) {
   var current = workspace.pop();
   var leftover = undefined;
   // If the current object is a string --> check whether it must be included in the result
   if(typeof(current) == "string" || current instanceof String) {
      if(current.getPDSubject().indexOf(person_id)>-1) { // getPDSubject() returns the person_id
that is associated with the string. indexOf(person_id) compares whether the stored person_id
associated with the string matches the person_id from the parameter.
         addToResult(current.getPDSubject(), undefined, current);
      }
   }
   // If the current object is not a string --> scan its properties
   else {
      leftover = [];
      for (var property in current) {
         if (current.hasOwnProperty(property) && current != current[property]) {
            // If the current checked property is a string --> check whether it must be included in the
result
            if(typeof(current[property]) == "string" || current[property] instanceof String) {
               if(current[property].getPDSubject().indexOf(person_id)>-1) {
                  addToResult(current[property].getPDSubject(), property, current[property]);
               }
            }
```

```
        // If the current checked property is an object --> append it to the leftovers
        else if(typeof(current[property]) == "object") {
          leftover.push(current[property]);
        }
      }
    }
  }
}
  // Append leftovers to workspace (if not blacklisted)
  if(typeof leftover != "undefined") {
    for(var i = 0; i < leftover.length; i++) {
      if(blacklist.indexOf(leftover[i]) == -1) {
        workspace.push(leftover[i]);
      }
    }
  }
}
  return result;
}
module.exports = exports = pD_findPerson;
```

A Generalized Computer Environment

Figure 7:
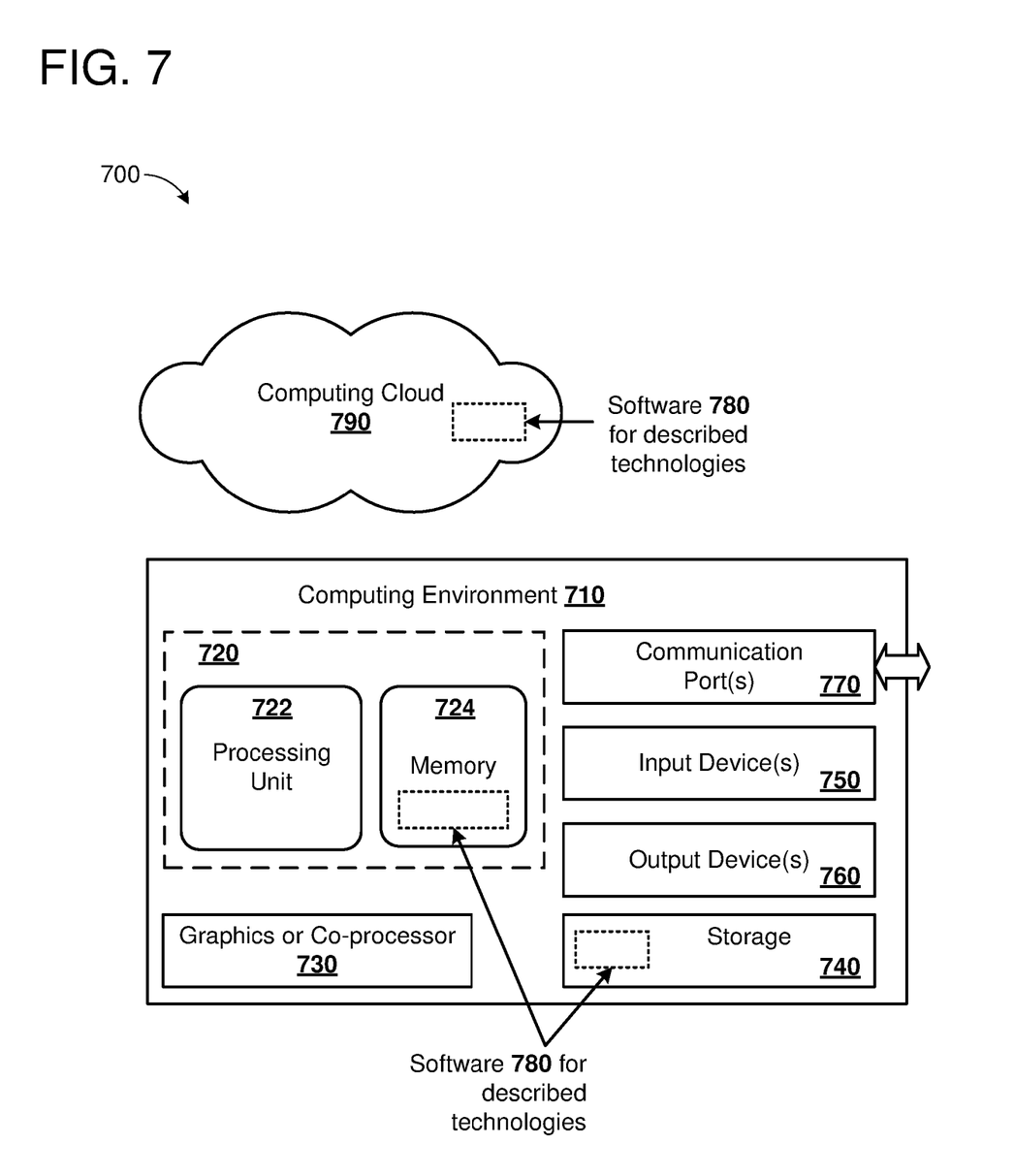
FIG. 7 is a diagram schematically depicting a computing environment suitable for implementation of disclosed technologies.

FIG. 7 illustrates a generalized example of a suitable computing system 700 in which described examples, techniques, and technologies, including construction, deployment, operation, query processing, and maintenance of a composite graph data structure or dynamic rooted trees according to disclosed technologies can be implemented. The computing system 700 is not intended to suggest any limitation as to scope of use or functionality of the present disclosure, as the innovations can be implemented in diverse general-purpose or special-purpose computing systems.

With reference to FIG. 7, computing environment 710 includes one or more processing units 722 and memory 724. In FIG. 7, this basic configuration 720 is included within a dashed line. Processing unit 722 executes computer-executable instructions, such as for implementing any of the methods or objects described herein for performing queries on a composite graph data structure representing a dynamic system, or various other architectures, components, handlers, managers, modules, or services described herein. Processing unit 722 can be a general-purpose central processing unit (CPU), a processor in an application-specific integrated circuit (ASIC), or any other type of processor. In a multi-processing system, multiple processing units execute computer-executable instructions to increase processing power. Computing environment 710 can also include a graphics processing unit or co-processing unit 730. Tangible memory 724 can be volatile memory (e.g., registers, cache, or RAM), non-volatile memory (e.g., ROM, EEPROM, or flash memory), or some combination thereof, accessible by processing units 722, 730. The memory 724 stores software 780 implementing one or more innovations described herein, in the form of computer-executable instructions suitable for execution by the processing unit(s) 722, 730. The memory 724 can also store a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 710 can have additional features, such as one or more of storage 740, input devices 750, output devices 760, or communication ports 770. An interconnection mechanism (not shown) such as a bus, controller, or network interconnects the components of the computing environment 710. Typically, operating system software (not shown) provides an operating environment for other software executing in the computing environment 710, and coordinates activities of the components of the computing environment 710.

The tangible storage 740 can be removable or non-removable, and includes magnetic disks, magnetic tapes or cassettes, CD-ROMs, DVDs, or any other medium which can be used to store information in a non-transitory way and which can be accessed within the computing environment 710. The storage 740 stores instructions of the software 780 (including instructions and/or data) implementing one or more innovations described herein.

The input device(s) 750 can be a mechanical, touch-sensing, or proximity-sensing input device such as a keyboard, mouse, pen, touchscreen, trackball, a voice input device, a scanning device, or another device that provides input to the computing environment 710. The output device(s) 760 can be a display, printer, speaker, optical disk writer, or another device that provides output from the computing environment 710.

The communication port(s) 770 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 700 can also include a computing cloud 790 in which instructions implementing all or a portion of the disclosed technology are executed. Any combination of memory 724, storage 740, and computing cloud 790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 8:
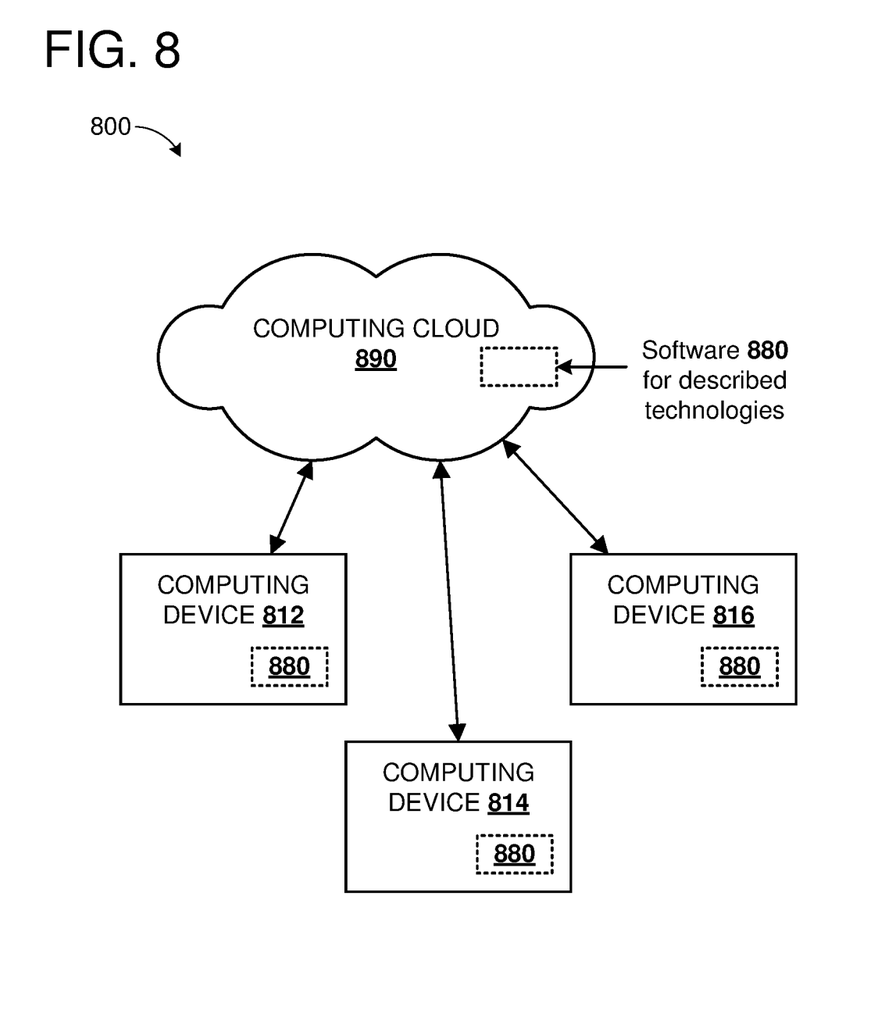
FIG. 8 is a diagram schematically depicting computing devices operating in conjunction with a computing cloud for implementation of disclosed technologies.

FIG. 8 depicts an example cloud computing environment 800 in which the described technologies can be implemented. The cloud computing environment 800 comprises a computing cloud 890 containing resources and providing services. The computing cloud 890 can comprise various types of cloud computing resources, such as computer servers, data storage repositories, networking resources, and so forth. The computing cloud 890 can be centrally located (e.g., provided by a data center of a business or organization) or distributed (e.g., provided by various computing resources located at different locations, such as different data centers and/or located in different cities or countries). It is to be understood that the example cloud computing environment 800 is one example environment in which the described technologies can be implemented, and other environments may be used in addition or alternatively to the example cloud computing environment. For example, the described technologies may be implemented on peer-to-peer networks and/or in coordination with a blockchain storage mechanism.

The computing cloud 890 can be operatively connected to various types of computing devices (e.g., client computing devices), such as computing devices 812, 814, and 816, and can provide a range of computing services thereto. One or more of computing devices 812, 814, and 816 can be computers (e.g., servers, virtual machines, embedded systems, desktop, or laptop computers), mobile devices (e.g., tablet computers, smartphones, or wearable appliances), or other types of computing devices. Communication links between computing cloud 890 and computing devices 812, 814, and 816 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 812, 814, and 816 can also be connected to each other.

Computing devices 812, 814, and 816 can utilize the computing cloud 890 to obtain computing services and perform computing operations (e.g., data processing, data storage, and the like). Particularly, software 880 for performing the described innovative technologies can be resident or executed in the computing cloud 890, in computing devices 812, 814, and 816, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 724, and storage 740. The term computer-readable storage media does not include signals and carrier waves. In addition, the term computer-readable storage media does not include communication ports (e.g., 770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, Basic, C, C++, C#, Curl, Dart, Fortran, Go, Java, JavaScript, Julia, Lisp, Matlab, Octave, Pascal, Perl, PHP, Python, R, Ruby, SAS, SPSS, Visual Basic, WebAssembly, Whitespace, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method, performed by one or more computing devices, for managing personal data, the method comprising:
receiving, for use by an application of the one or more computing devices, personal data associated with a data subject, wherein the personal data is associated with a virtual identity of the data subject;
storing the personal data; and
storing identifying information that is linked to the personal data, wherein the identifying information is included in shadow data associated with the personal data, wherein the shadow data for the personal data is invisible to the application or inaccessible by the application, and wherein the identifying information comprises:
a virtual identity identifier of the virtual identity, and
a creation timestamp of the personal data.

2. The method of claim 1, wherein the virtual identity identifier comprises an IP address, user credentials, a phone number, an email address, or a cookie identifier.

3. The method of claim 1, wherein the data subject is associated with a plurality of different virtual identities.

4. The method of claim 1, wherein the personal data is stored in a first memory location and the shadow data is stored in a second memory location, and wherein the first memory location includes a pointer to the second memory location.

5. The method of claim 4, further comprising receiving additional personal data associated with a second virtual identity of the data subject, storing the additional personal data in a third memory location, and storing additional identifying information that is linked to the personal data, wherein the additional identifying information comprises the second virtual identity of the data subject and a second creation timestamp of the additional personal data.

6. The method of claim 5, wherein the additional identifying information is included in additional shadow data associated with the additional personal data, wherein the additional shadow data is stored in a fourth memory location, and wherein the third memory location includes a pointer to the fourth memory location.

7. The method of claim 4, wherein the second memory location further includes taint tracking data.

8. One or more computer-readable storage media storing instructions which, when executed by one or more hardware processors, cause the hardware processors to perform actions comprising:
detecting a request for retrieval of personal data for a data subject;
identifying parameters of the request, the parameters including at least one virtual identity identifier for the data subject;
searching data storage to locate shadow data that includes identifying information matching the parameters of the request, the located shadow data being linked to associated personal data comprising a plurality of personal data items, wherein, for at least one personal data item of the plurality of personal data items, memory space of a variable associated with the at least one personal data item includes a pointer to another memory address that includes the virtual identity identifier; and
outputting the associated personal data to the data subject.

9. The one or more computer-readable storage media of claim 8, wherein the actions further comprise verifying whether the request is received from the data subject and denying access to the personal data of the data subject when the request is not verified as being received from the data subject.

10. The one or more computer-readable storage media of claim 8, wherein the virtual identity identifier comprises an IP address, an email address, a phone number, user credentials, or a cookie identifier and wherein the parameters further include a time parameter comprising a time range during which the data subject was associated with the virtual identity identifier.

11. The one or more computer-readable storage media of claim 8, wherein the located shadow data includes shadow data that is stored in a first memory location that further includes a pointer to a second memory location, wherein the associated personal data is stored in the second memory location.

12. The one or more computer-readable storage media of claim 8, wherein the request includes a plurality of virtual identity identifiers associated with the data subject.

13. The one or more computer-readable storage media of claim 12, wherein the data subject is associated with a plurality of virtual identity identifiers, and wherein the request includes a subset of the plurality of virtual identity identifiers.

14. A system comprising:
one or more hardware processors with memory coupled thereto;
computer-readable media storing instructions executable by the one or more hardware processors, the instructions comprising:
first instructions to receive, from a first application or application programming interface (API), a request for personal data associated with a plurality of virtual identities of a data subject, the plurality of virtual identities of the data subject including a first virtual identity;
second instructions to locate instances of first identifying information corresponding to the first virtual identity in data storage memory locations that store shadow data for a plurality of personal data items, wherein the shadow data is invisible or inaccessible to the first application or API;
third instructions to identify, for each instance of the identifying information, a respective personal data item that is linked to the data storage memory location in which the instance of the identifying information is stored; and
fourth instructions to output the respective personal data items.

15. The system of claim 14, wherein the plurality of virtual identities of the data subject further includes a second virtual identity that corresponds to second identifying information.

16. The system of claim 15, wherein the first identifying information includes a first virtual identity identifier and a first time range during which the data subject was associated with the first virtual identity identifier, and wherein the second identifying information corresponds to a second virtual identity identifier and a second time range during which the data subject was associated with the second virtual identity identifier.

17. The system of claim 16, wherein the first virtual identity identifier is different from the second virtual identity identifier.

18. The system of claim 16, wherein the shadow data is visible or accessible to a second, taint-tracking application or API, and wherein the instructions further comprise fifth instructions to locate, using the taint-tracking application or API, instances of the second identifying information in the data storage memory locations that store the shadow data for the plurality of personal data items, sixth instructions to identify, for each instance of the second identifying information, a respective additional personal data item that is linked to the data storage memory location in which the instance of the second identifying information is stored; and seventh instructions to output the respective additional personal data items.

19. The system of claim 16, wherein the first virtual identity identifier and the respective personal data items are not stored in association with a civil identity of the data subject.

* * * * *